United States Patent
Baron, Sr. et al.

(10) Patent No.: US 8,264,345 B2
(45) Date of Patent: Sep. 11, 2012

(54) SYSTEM AND METHOD OF PROVIDING REAL-TIME SITE SPECIFIC INFORMATION

(75) Inventors: Robert O. Baron, Sr., Huntsville, AL (US); Tony L. Benson, Huntsville, AL (US); Thomas S. Thompson, Athens, AL (US); Erick C. Jones, Madison, AL (US); Robert J. Dreisewerd, Jr., Owens Cross Roads, AL (US)

(73) Assignee: Baron Services, Inc., Huntsville, AL (US)

( * ) Notice: Subject to any disclaimer, the term of this patent is extended or adjusted under 35 U.S.C. 154(b) by 14 days.

(21) Appl. No.: 12/627,031

(22) Filed: Nov. 30, 2009

(65) Prior Publication Data

US 2011/0128144 A1 Jun. 2, 2011

(51) Int. Cl.
*G08B 1/08* (2006.01)

(52) U.S. Cl. ............. 340/539.3; 340/539.1; 340/539.11; 340/539.13; 340/539.28; 340/901; 340/7.48; 340/905; 340/988; 340/540; 701/415; 701/423; 701/425; 701/426; 455/456.1; 455/456.3

(58) Field of Classification Search ............... 340/539.3, 340/539.1, 902, 4.5, 4.51, 7.46, 7.48, 539.11, 340/539.13, 539.28, 540, 901, 905, 988; 455/343.1–343.6, 574, 404.1, 456.1, 456.3; 713/320–324; 701/415, 423, 425, 426

See application file for complete search history.

(56) References Cited

U.S. PATENT DOCUMENTS

| | | |
|---|---|---|
| 4,521,857 A | 6/1985 | Reynolds, III |
| 5,121,430 A | 6/1992 | Ganzer et al. |
| 5,265,024 A | 11/1993 | Crabill et al. |
| 5,898,680 A | 4/1999 | Johnstone et al. |
| 5,940,776 A | 8/1999 | Baron et al. |
| 6,018,699 A | 1/2000 | Baron, Sr. et al. |
| 6,104,582 A | 8/2000 | Cannon et al. |
| 6,112,074 A | 8/2000 | Pinder |
| 6,112,075 A | 8/2000 | Weiser |
| 6,177,873 B1 | 1/2001 | Cragun |
| 6,204,761 B1 | 3/2001 | Vanderable |
| 6,209,026 B1 | 3/2001 | Ran et al. |
| 6,252,539 B1 | 6/2001 | Phillips et al. |
| 6,255,953 B1 | 7/2001 | Barber |
| 6,266,063 B1 | 7/2001 | Baron et al. |
| 6,272,433 B2 | 8/2001 | Baron et al. |
| 6,275,774 B1 | 8/2001 | Baron, Sr. et al. |
| 6,289,277 B1 | 9/2001 | Feyereisen et al. |
| 6,295,001 B1 | 9/2001 | Barber |
| 6,297,766 B1 | 10/2001 | Koeller |
| 6,317,686 B1 | 11/2001 | Ran |
| 6,351,218 B1 | 2/2002 | Smith |

(Continued)

*Primary Examiner* — George Bugg
*Assistant Examiner* — Sisay Yacob
(74) *Attorney, Agent, or Firm* — Mark Swanson; Frank M. Caprio; Bradley Arant Boult Cummings LLP

(57) ABSTRACT

A weather alert manager is used to provide real-time, site specific information to a user regarding weather and possibly other hazards. The weather alert manager compares meteorological data, a user profile including information on points of interest to the user, and geographical data to determine if weather will impact one or more of the user's points of interest. The user's points of interest include at least one mobile point of interest, which periodically transmits its location. The weather alert manager transmits a user alert message if one is needed, and a remote receiver notifies the user that a message has been received.

26 Claims, 6 Drawing Sheets

U.S. PATENT DOCUMENTS

| | | | |
|---|---|---|---|
| 6,401,039 B1 | 6/2002 | Baron et al. | |
| 6,404,880 B1 | 6/2002 | Stevens | |
| 6,462,665 B1 | 10/2002 | Tarlton et al. | |
| 6,490,525 B2 | 12/2002 | Baron, Sr. et al. | |
| 6,493,633 B2 | 12/2002 | Baron, Sr. et al. | |
| 6,498,987 B1 | 12/2002 | Wilt et al. | |
| 6,505,123 B1 | 1/2003 | Root et al. | |
| 6,581,009 B1 | 6/2003 | Smith | |
| 6,590,529 B2 | 7/2003 | Schwoegler | |
| 6,603,405 B2 * | 8/2003 | Smith | 340/905 |
| 6,646,559 B2 | 11/2003 | Smith | |
| 6,650,972 B1 | 11/2003 | Robinson et al. | |
| 6,654,689 B1 | 11/2003 | Kelly et al. | |
| 6,700,482 B2 | 3/2004 | Ververs et al. | |
| 6,753,784 B1 | 6/2004 | Sznaider et al. | |
| 6,754,585 B2 | 6/2004 | Root et al. | |
| 6,823,263 B1 | 11/2004 | Kelly et al. | |
| 6,826,481 B2 | 11/2004 | Root et al. | |
| 6,829,536 B2 | 12/2004 | Moore | |
| 6,836,730 B2 | 12/2004 | Root et al. | |
| 6,845,324 B2 | 1/2005 | Smith | |
| 6,947,842 B2 | 9/2005 | Smith et al. | |
| 6,963,853 B1 | 11/2005 | Smith | |
| 6,985,813 B2 | 1/2006 | Root et al. | |
| 7,058,510 B2 | 6/2006 | Kelly et al. | |
| 7,084,775 B1 | 8/2006 | Smith | |
| 7,089,116 B2 | 8/2006 | Smith | |
| 7,139,664 B2 | 11/2006 | Kelly et al. | |
| 7,181,345 B2 | 2/2007 | Rosenfeld et al. | |
| 7,191,065 B2 | 3/2007 | Root et al. | |
| 7,245,214 B2 | 7/2007 | Smith | |
| 7,248,159 B2 | 7/2007 | Smith | |
| 7,249,159 B1 | 7/2007 | Horvitz et al. | |
| 7,275,089 B1 | 9/2007 | Marshall et al. | |
| 7,289,908 B2 | 10/2007 | Root et al. | |
| 7,315,782 B2 | 1/2008 | Root et al. | |
| 7,411,493 B2 | 8/2008 | Smith | |
| 7,421,344 B1 | 9/2008 | Marsh et al. | |
| 7,518,505 B2 | 4/2009 | Smith | |
| 2001/0030624 A1 | 10/2001 | Schwoegler | |
| 2002/0049527 A1 * | 4/2002 | Kohno et al. | 701/117 |
| 2003/0063004 A1 * | 4/2003 | Anthony et al. | 340/574 |
| 2003/0169181 A1 * | 9/2003 | Taylor | 340/902 |
| 2003/0195811 A1 * | 10/2003 | Hayes et al. | 705/26 |
| 2004/0010372 A1 | 1/2004 | Schwoegler | |
| 2004/0043760 A1 | 3/2004 | Rosenfeld et al. | |
| 2004/0080430 A1 | 4/2004 | Videtich | |
| 2004/0243533 A1 | 12/2004 | Dempster et al. | |
| 2005/0240378 A1 | 10/2005 | Smith et al. | |
| 2006/0015254 A1 | 1/2006 | Smith | |
| 2006/0022048 A1 * | 2/2006 | Johnson | 235/462.1 |
| 2007/0049260 A1 | 3/2007 | Yuhara et al. | |
| 2007/0052533 A1 * | 3/2007 | Glazer | 340/539.11 |
| 2007/0083328 A1 | 4/2007 | Suzuki | |
| 2007/0094262 A1 | 4/2007 | Suzuki et al. | |
| 2008/0169920 A1 * | 7/2008 | Spence | 340/539.1 |

* cited by examiner

SYSTEM AND METHOD OF PROVIDING REAL-TIME SITE SPECIFIC INFORMATION

BACKGROUND OF THE INVENTION a. Field of the Invention

The current invention relates to a system and method for providing information to a user, including weather information. The information is specific to sites of interest to the user and the information is also currently relevant. The system can also be used to provide information other than weather information, such as hazard information.

b. Background of the Invention

Weather can be hazardous to both people and to property. Floods, tornadoes, hurricanes, blizzards, windstorms, extreme cold, extreme heat, and a multitude of other circumstances present risks directly related to weather. People can be caught in severe weather and have their lives put at risk. Besides threatening people's lives, weather can also damage property.

Many people will have several locations they are concerned about at any one time. These locations or points of interest can include such things as a person's home, a business or place of work, a vacation home, someone's own physical location, the position of loved ones such as children, parents, or a spouse, or any of a wide number of other possible locations. People may want notice of weather which can impact any of these points of interest. For the notice to be most effective, it should be specific to the points of interest for the individual, and it should be timely in that it should provide warnings well enough in advance that a person can respond, but not so far in advance that a person loses interest.

Some of these points of interest can be mobile so that the location of the point of interest is variable. For example, the location of an individual can change as the individual walks, drives or rides to a different position. Also, the position of a loved one can change if that person moves to a different location. It is possible for the position of an individual to be tracked even though that individual is mobile. Devices such as global positioning indicators, commonly referred to as "GPS," are available which can track a person's location.

Different people may want different types of notices. Certain people will not want to be disturbed unless any impending weather is very severe. Other people will not want to be disturbed at certain times of day, such as during their work, or when they are asleep. On the other hand, some people will want to know about impending weather in practically every situation. For a weather notice to be deserving of attention, it should be relevant to the points of interest for the individual, it should be timely, and the information should preferably be customized to that particular person.

Providing information that is specific to a person's points of interests, information that is current, and information that is customized to that person's preferences can have many advantages. This includes possibly saving lives because it can allow a person to avoid severe weather or to find a safe location to ride out severe weather. It can also allow someone to notify a loved one that severe weather is about to strike so the loved one can take precautions. Such notice may also reduce property damage by allowing someone to prepare a residence or other property before severe weather strikes. This can include such things as putting a vehicle inside a safe building or closing shutters on a house.

Other systems for providing timely information have been described. For example, Baron, Sr. et al. describes a notification system in U.S. Pat. No. 6,493,633, issued Dec. 10, 2002. This patent describes a computer system configured to receive data indicative of an event, and to define an area affected by the event. The computer system distributes information indicative of the area affected by the event to a plurality of remote devices. These remote devices communicate with a distribution site to receive information indicating the area affected by the event, and each remote device is configured to determine if it is affected by the event and to respond accordingly.

Kelly et al. describe a system for providing personalized storm warnings in U.S. Pat. No. 7,139,664, issued Nov. 21, 2006. Kelly describes a system for generating storm warnings which are automatically tailored for a particular user's location of interest. The user establishes an individualized user profile which may define a location of interest and a contact address for receiving a storm warning. The user profile can also define characteristics of a storm for which the user desires to receive storm warnings. A detailed storm track is generated, and compared to the user profile. Personalized storm warnings are then generated for user profiles defining a location within a predicted storm track if the storm characteristics specified in the storm profile are met. The storm warning can then be delivered via e-mail, cell phone, pager, etc.

U.S. Pat. No. 7,248,159 by Smith describes another event reporting system. Smith describes a system for receiving hazard and event information in a mobile unit, and using that information to warn a user of a future hazard with reference to the mobile unit's location and/or intended direction of travel. An algorithm compares a forecast location of a mobile device with a forecast hazard, and transmits a warning to each mobile unit predicted to encounter the hazard. The mobile unit's position is updated in an event center as the mobile unit moves, and revised warnings are transmitted as applicable.

Timely, customized notice of severe weather can provide peace of mind. A parent may know that their child was not impacted by the severe weather because no notice was received. On the other hand, if severe weather did strike their child's location, they may be able to contact local hospitals or emergency services with important information on allergies, conditions or other information relating to their child or loved one. A service which can provide current information specific to an individual's own points of interest can also provide information on other hazards. This can include such things as chemical spills, traffic, accidents, criminal activity, volcanic eruptions, and a multitude of other hazards. The provision of a system which can provide this sort of information will benefit people in many ways.

BRIEF SUMMARY OF THE INVENTION

A weather alert manager is used to provide real-time, site specific information to a user regarding weather and possibly other hazards. The weather alert manager can be a computer with an input device which receives meteorological data and other information. The weather alert manager can access geographical data, compare it to meteorological data, and generate information indicative of the current and projected future position of hazardous weather. The weather alert manager can also include, or be in communication with, an output device for transmitting information to users. A user can establish a user profile with a plurality of points of interest specific to that user when initiating the weather reporting service. The points of interest can include at least one mobile point of interest which may have a variable location. The user profile can include the location of the points of interest as well as information for a remote receiver. The remote receiver information can include contact information for the remote receiver, such as a telephone number or an e mail address. The weather alert manager can access the user profile and geographic data, and correlate that with the meteorological data to determine if a user alert message is needed for a particular user. The mobile point of interest may transmit its current location periodically, so the weather alert manager can determine the mobile point of interest location. If the weather alert manager determines that a user alert message is needed for a particular individual, a user alert message can be prepared and transmitted to provide real-time, site specific information to the individual.

Other aspects and advantages of the invention will be apparent from the following description and the appended claims.

BRIEF DESCRIPTION OF THE SEVERAL VIEWS OF THE DRAWINGS

It should be noted that identical features in different drawings are shown with the same reference numeral.

DETAILED DESCRIPTION OF THE INVENTION

The various embodiments of the present invention and their advantages are best understood by referring to FIGS. 1 through 6 of the drawings. When one specific drawing is referenced, the reader should understand there is a general reference to all the drawings. The elements of the drawings are not necessarily to scale, with emphasis instead being placed upon clearly illustrating the principles of the invention. Throughout the drawings, like numerals are used for like and corresponding parts of the various drawings.

The User

Figure 2:
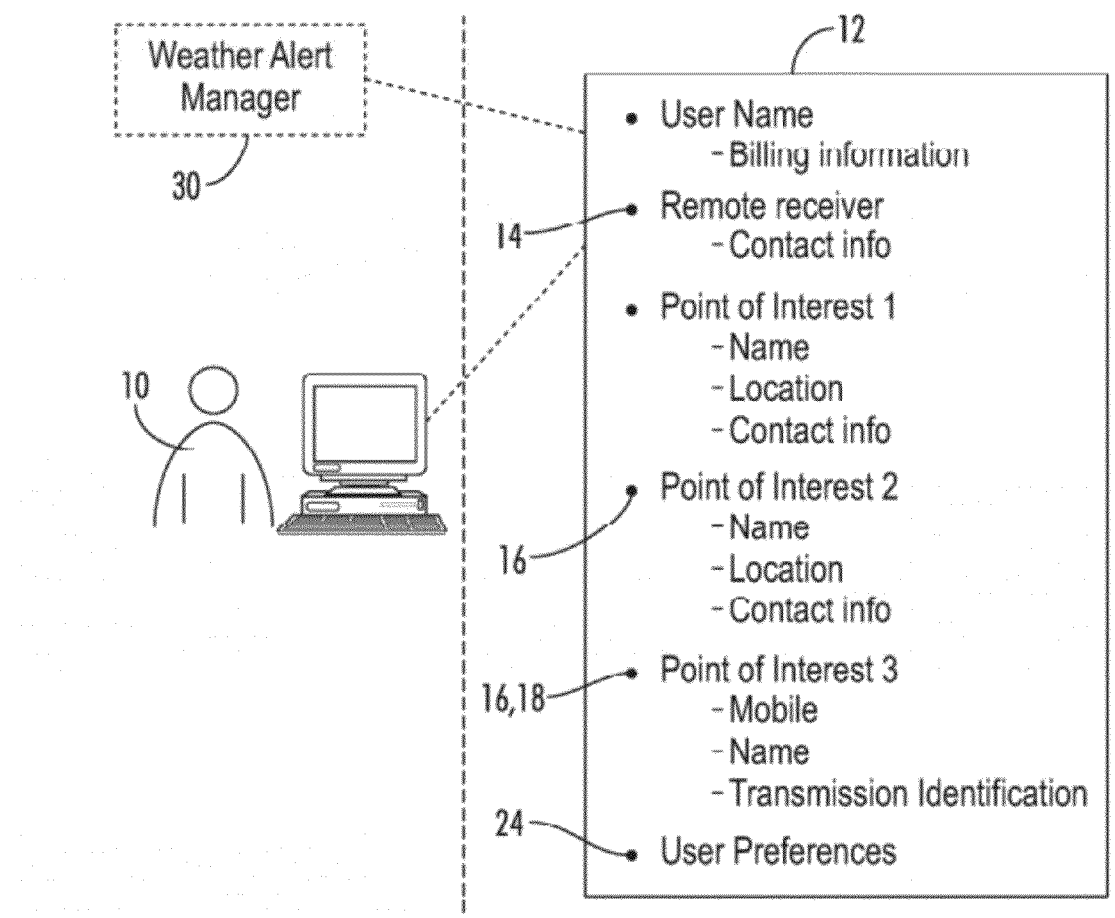
FIG. 2 is a schematic of one embodiment of a user creating a user profile.

Referring to FIG. 2, a user 10 is an individual who is interested in receiving site specific, real time information regarding weather or other hazards. The term "real-time" means currently in existence or forecasted at a short time in the future, normally within an hour or less. One method of identifying a user 10 to receive site specific, real-time information is for the user 10 to provide a user profile 12. A user profile 12 can be prepared in many ways. It can be entered into a computer, such as from a website or through an e mail program. It can be prepared by filling in blanks on a form. A person could call in and provide the information for a user profile. Machine readable forms could be used, or any of a wide variety of other options that allow a user 10 to provide specific information to facilitate the preparation of messages customized to that particular user 10.

One thing provided in the user profile 12 is information about a remote receiver 14. A remote receiver 14 is capable of receiving information from outside sources. The user 10 provides contact information for the remote receiver 14 as part of the user profile 12. The contact information can be such things as a cell phone number, a telephone number, an e mail address, a pager number, a radio frequency, or anything else which provides the particular information necessary to contact the remote receiver 14 associated with the user 10.

The user 10 can designate a plurality of remote receivers 14 if desired. The user profile 12 can provide for the simultaneous contact of several different remote receivers 14, or the user profile 12 can request sequential contact of remote receivers 14 as desired. For example, the user profile 12 may request that the primary remote receiver 14 be contacted first, but if there is no response, then a secondary remote receiver 14 would be contacted. Alternatively, the user profile 12 may outline that the primary, secondary, and tertiary remote receivers 14 be simultaneously contacted. In one embodiment, certain remote receivers 14 are contacted for certain events at certain locations, while other remote receivers 14 are contacted for other events and/or other locations.

Many devices can be used as a remote receiver 14. The remote receiver 14 can be a cell phone, a land line phone, a computer, a pager, a radio, or any other device capable of receiving messages for a user 10. The remote receiver 14 preferably is able to notify the user 10 when a message is received. This notice can be such things as the ringing of a telephone or the vibration of a cell phone when in vibrate mode. The notice could be a blinking light, or an audio signal such as a message displayed aurally by a radio. The notice could also be the listing of a new e mail on an e mail account.

In some embodiments, the remote receiver 14 can display the message. In this description, the term "display" includes a video display which can be seen and/or an audio message which can be heard. Alternatively, the remote receiver 14 may simply notify the user 10 of a message, and the user 10 can then access the message independent of the remote receiver 14, such as with a pager. In some embodiments, the remote receiver 14 can access the internet to receive a display on the internet. The remote receiver 14 may have a display screen for visually displaying a message, and/or the remote receiver 14 may have speakers to aurally display the message.

The user profile 12 may also include one or more points of interest 16. The points of interest 16 are particular items which have significance to the user 10. Points of interest 16 can be such things as a home, a place of work, or a cell phone typically carried by the user 10. It can also be a cell phone typically carried by a loved one or any other person that the user 10 desires to keep track of. A point of interest 16 can be a tracking device, a vacation home, or any other item which has significance to the user 10. In the user profile 12, the user 10 will provide details about the points of interest 16. These details can include such things as the location, particularly for stationary sources. For stationary sources, such locations can be provided by a street address, which can be readily converted to more generalized geo-referenced coordinates, such as latitude and longitude. It can include a user-provided name, such as "home" or "work." The details can also include a source identifier, such as a cell phone number for a mobile point of interest 18 or some other way to identify the point of interest 16.

Figure 3:
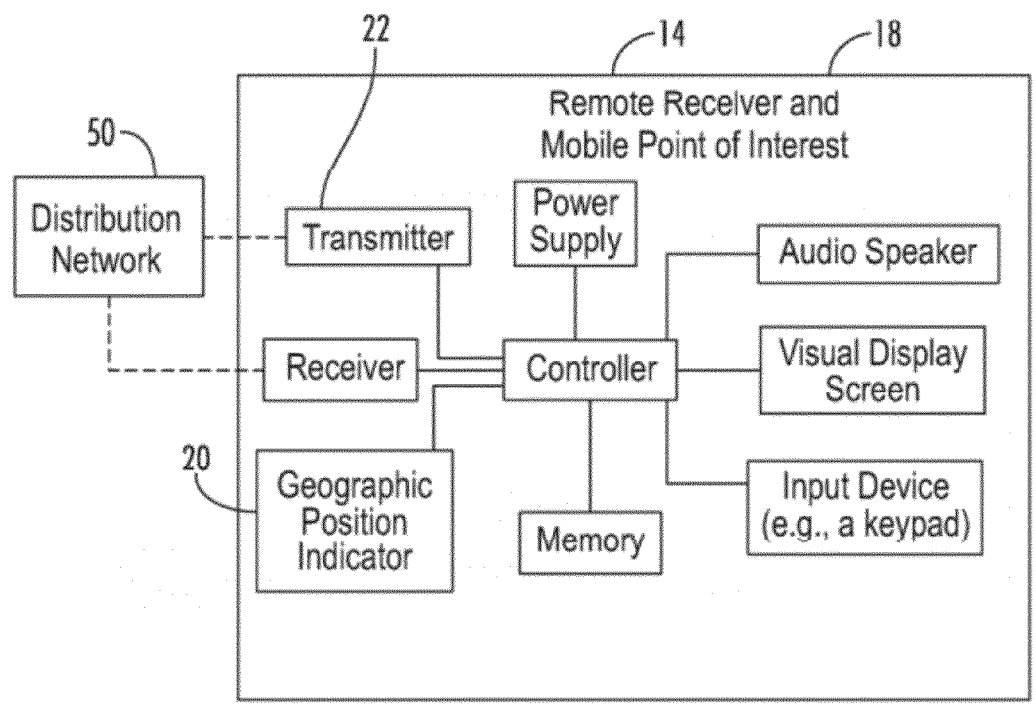
FIG. 3 is a schematic of one embodiment of a remote receiver, where the remote receiver is also a mobile point of interest.

The plurality of points of interest 16 may include at least one mobile point of interest 18 as shown in greater detail in FIG. 3. FIG. 3 is a schematic of one embodiment of a remote receiver 14, where the remote receiver 14 is also a mobile point of interest 18. Therefore, the mobile point of interest 18 is a subset of all the points of interest 16, and the mobile point of interest 18 is specifically referenced to provide additional clarity and detail to this description. The mobile point of interest 18 can be a cell phone, a pager, an automobile, a tracking device, or some other mobile item. The mobile point of interest 18 preferably has a geographic position indicator 20, a transmitter 22, and memory. The geographic position indicator 20 can be a global positioning system (GPS), but it can also be other types of geographic position indicators, such as loran or other global navigation satellite systems. The mobile point of interest 18 also preferably has a transmitter 22 for transmitting the current location of the mobile point of interest 18. The transmitter 22 may use a distribution network 50 to relay location information and/or other information. As discussed further below, the location information related to the mobile point of interest 18 may be transmitted to a weather alert manager 30 for use in alerting users 10. This location information can be transmitted in any of a variety of formats understood by those of skill in the art, including but not limited to E-mail, text messages, SMS, etc.

The mobile point of interest 18 preferably will transmit its geographic location periodically. Different protocols can be used for transmitting the location of the mobile point of interest 18. In one embodiment, the mobile point of interest 18 will transmit its location only when the mobile point of interest 18 has moved more than a set distance. The set distance can be any of a wide variety of distances, and can be established such that significant movement of the mobile point of interest 18 is reflected in a new position, but minor movement does not result in transmittal of a new position. This can include a set distance of, for example, 100 yards, ¼ mile, one mile, 10 miles, or any other distance deemed to be appropriate. The mobile point of interest 18 can have hardware, software, and/or firmware to monitor distances, and transmit only when the threshold is exceeded.

The mobile point of interest 18 can transmit its geographic location under several different embodiments. In one embodiment, the set distance can be specified in the user profile 12. In another embodiment, the mobile point of interest 18 will have a default set distance stored in memory. In an alternative embodiment, the mobile point of interest 18 will transmit its current location at set time intervals. In this embodiment, after a certain period of time has passed, the mobile point of interest 18 will transmit its location regardless of whether the mobile point of interest 18 has changed positions or not. In another embodiment, the mobile point of interest 18 transmits its location at set time intervals and when the mobile point of interest 18 has moved a set distance. In yet another embodiment, the mobile point of interest 18 may transmit its location at set time intervals unless the mobile point of interest 18 has entered a power save mode. Once the mobile point of interest 18 has entered a power save mode, it will transmit its location only upon moving a set distance. Transmittal only after moving a set distance may minimize the amount of transmittals made by the mobile point of interest 18, which can save battery power. In some embodiments, limiting the number of transmittals can also reduce costs for a user 10, such as if a user 10 pays per text message or for air time and messages are sent in a format for which the user 10 is charged. By setting a mobile point of interest 18 to transmit its location only after moving a sufficient distance, it may be possible to save battery power because transmittals can be reduced over alternative embodiments where the transmittals are made at set time intervals.

The mobile point of interest 18 in certain embodiments can also function as the remote receiver 14. For example, if the mobile point of interest 18 is a cell phone, it could also be used as the remote receiver 14 because it is capable of receiving a message and notifying the user 10 of the message. In certain embodiments, the mobile point of interest 18 can also display a message received. In other embodiments, the mobile point of interest 18 may be able to connect to the World Wide Web and allow a user 10 to access a website, email, or other means of notification to display a more complete message.

The user profile 12 can also include additional data such as billing information, related individuals, geographic region desired to be covered, and a wide variety of other information, as best seen in FIG. 2. In some embodiments, the user profile 12 can include preferences 24 set by the user 10. Preferences 24 can cover a wide variety of possibilities; for example, a user 10 may specify when the user 10 would like to receive notification of impending weather or other hazards. This can be specified for a time of day, day of the week, time of the month, etc. A user 10 may want to be notified of impending weather during the day but not at night while sleeping. A user 10 may want to be notified of impending weather during the week, but not during the weekend, or the user 10 may desire to be notified of impending weather during busy periods of the month for that particular user. In some embodiments, a user 10 may include a family or other individuals where different family members or individuals may be able to specify different preferences 24. Family members or different individuals may all include the same points of interest 16, but they may have different preferences 24 as to the type of information they desire to receive regarding those points of interest 18.

A user 10 may have different preferences 24 for different points of interest 16, or different preferences for different types of weather events. For example, a user 10 may specify that she would like to receive messages relating to tornadoes, hail or severe storms relating to a specified mobile point of interest 18, but she would like to receive messages relating to tornadoes, hail, severe storms, wind storms, or flooding relating to her home. In this example, the specified mobile point of interest 18 could be a device frequently carried by the user 10, such as a cell phone. Similarly, a user 10 may specify that she would like to receive messages only when the rain intensity reaches a certain level, or a certain hail size is expected. A user 10 may specify they would like to receive messages relating to home at all times, but would only like to receive messages relating to work during working hours. A wide variety of preferences 24 can be specified by a user 10. The user profile 12 may have default preferences 24 which are utilized if a user 10 does not enter all the information options available in a user profile format. Therefore, if a user 10 did not desire to spend the time and effort to list all their preferences 24, default values would be provided. In an alternate embodiment, the method can operate without the user 10 specifying any preferences 24, and set values are used for users 10. In yet another embodiment, it is possible for different categories of service to be provided for different types of users 10. For example, a premium user 10 may be able to list a wide variety of preferences 24, whereas an economy user 10 may have limited preferences 24 or no preferences 24. A premium user 10 may be able to list more points of interest 16 than an economy user. There are many other options which can be included in a user profile 12 as desired.

Weather Alert Manager

Figure 1:
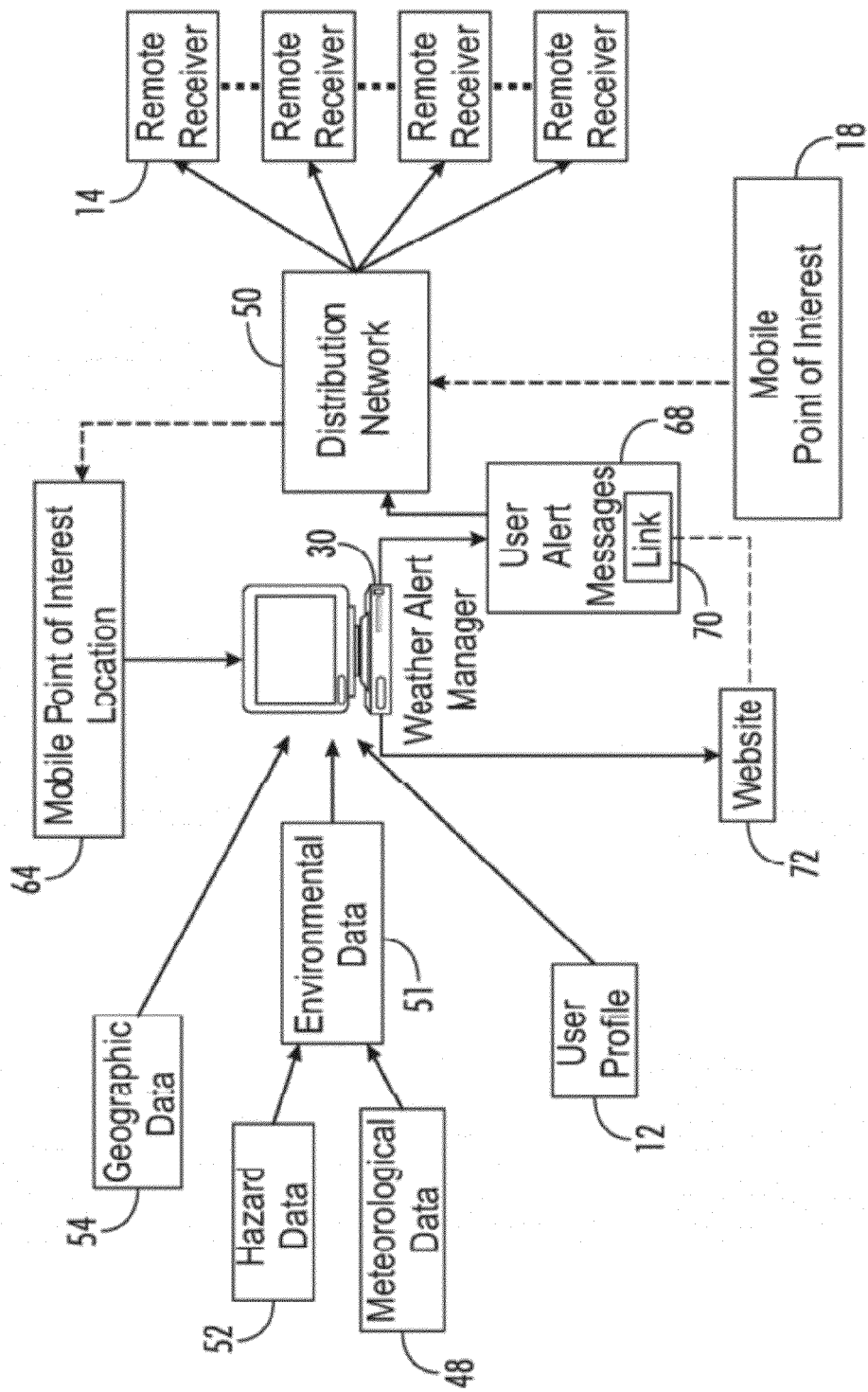
FIG. 1 is a schematic showing one embodiment of the interaction between the weather alert manager and various other associated components of the present invention.
Figure 4:
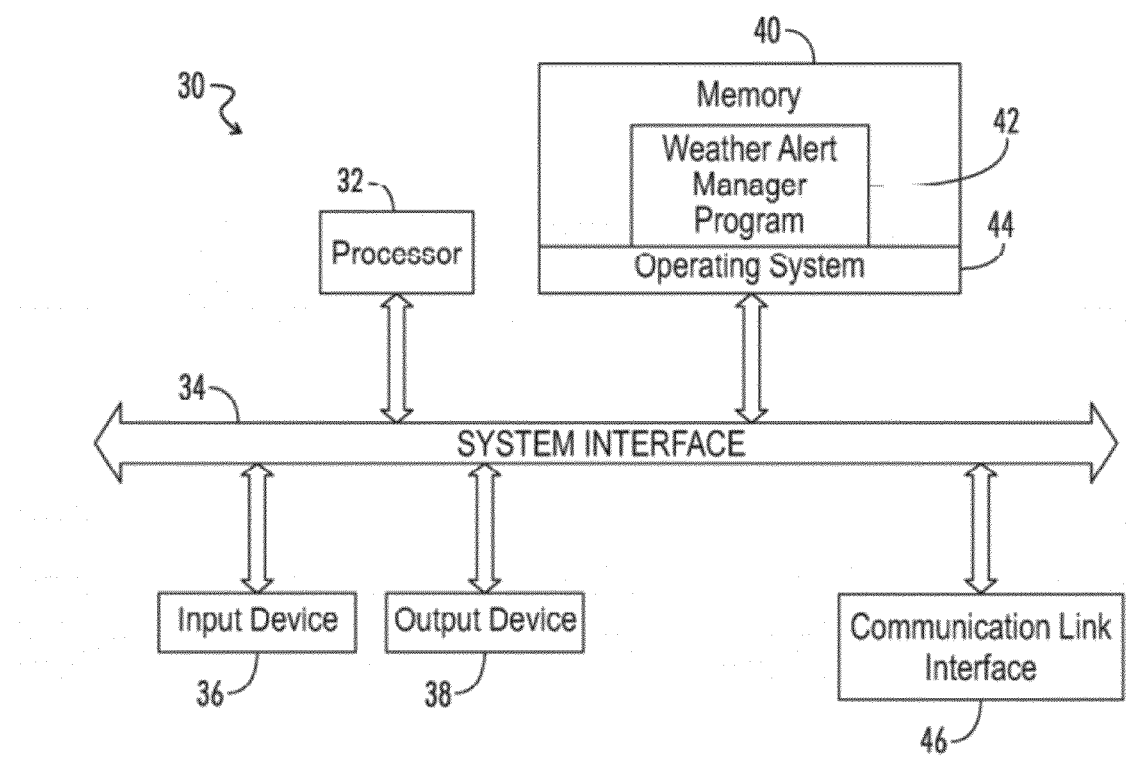
FIG. 4 is a schematic of one embodiment of the weather alert manager.

A weather alert manager 30 is used to process information and provide notices to the user 10, as seen in FIGS. 1 and 4. The weather alert manager 30 is a computer having the basic components of many computers. The weather alert manager 30 includes a processor 32 that can communicate with the other elements within the weather alert manager 30 via a system interface 34. One or more input devices 36 can also be included. Input devices can include, for example, a keyboard, a mouse, or a modem. The input device 36 can be used to input data to the weather alert manager 30.

An output device 38 is also included with the weather alert manager 30. An output device 38 can include a monitor or speakers to output data from the weather alert manager 30, as well as a modem. A modem can serve as both an input and an output device 36, 38, because it can both receive and transmit information. A memory 40 within the weather alert manager 30 contains the weather alert manager program 42, which is used for imparting the functions described herein. The memory 40 is a machine readable storage device, such as a hard disc or CD. The memory 40 is not a mere signal, but is a physical device associated with the weather alert manager 30. The weather alert manager 30 may also use one or more databases to facilitate operations. In addition, the memory 40 includes an operating system 44 that communicates with the weather alert manager program 42 and enables execution of the weather alert manager program 42 by the processor 32. The memory 40 can include a hard disk which may be provided as non-volatile memory for storing information within the weather alert manager 30. The weather alert manager 30 includes a communication link interface 46 for interfacing the weather alert manager 30 with other related systems. The communication link interface 46 can be used for receiving information such as meteorological data 48 or for transmitting data or information to a distribution network 50. The communication link interface 46 can serve as an output device 38 when communicating information from the weather alert manager 30 to other computers or devices, and the communication link interface 46 can serve as an input device 36 when receiving information from other computers or devices.

In alternative embodiments, the weather alert manager 30 can be comprised of a cluster of two or more computers in communication. The weather alert manager 30 is configured to receive meteorological data 48 and other information such as hazard information 52 via the communication link interface 46 or alternatively via input through an input device 36. The input can be manual or automatic. The weather alert manager 30 can access geographic data 54 when needed. The geographic data 54 can be saved in the memory 40, but the geographic data 54 may also be located elsewhere and accessed by the weather alert manager 30 when needed. This access can be by the communication link interface 46 or other means as appropriate. The geographic data 54 can include information such as roads, commonly known landmarks, political boundaries, elevations and other information pertinent to the geography of the region being covered. Commonly known landmarks can include such things as parks, specific buildings, historical sites, etc.

The weather alert manager 30 can also access the user profile 12 when needed. The weather alert manager 30 may save the user profile 12 in memory 40, but in alternative embodiments the weather alert manager 30 may access the user profile 12 from a separate computer or from alternate sources as necessary. The weather alert manager 30 is said to access the user profile 12 if the user profile 12 is stored in the weather alert manager memory 40, or if the user profile 12 is retrieved from another location such as a separate computer or database, or any combination thereof. The weather alert manager 30 may also access various other information sources as necessary to perform the functions as described herein.

Meteorological and Hazard Data

Figure 5:
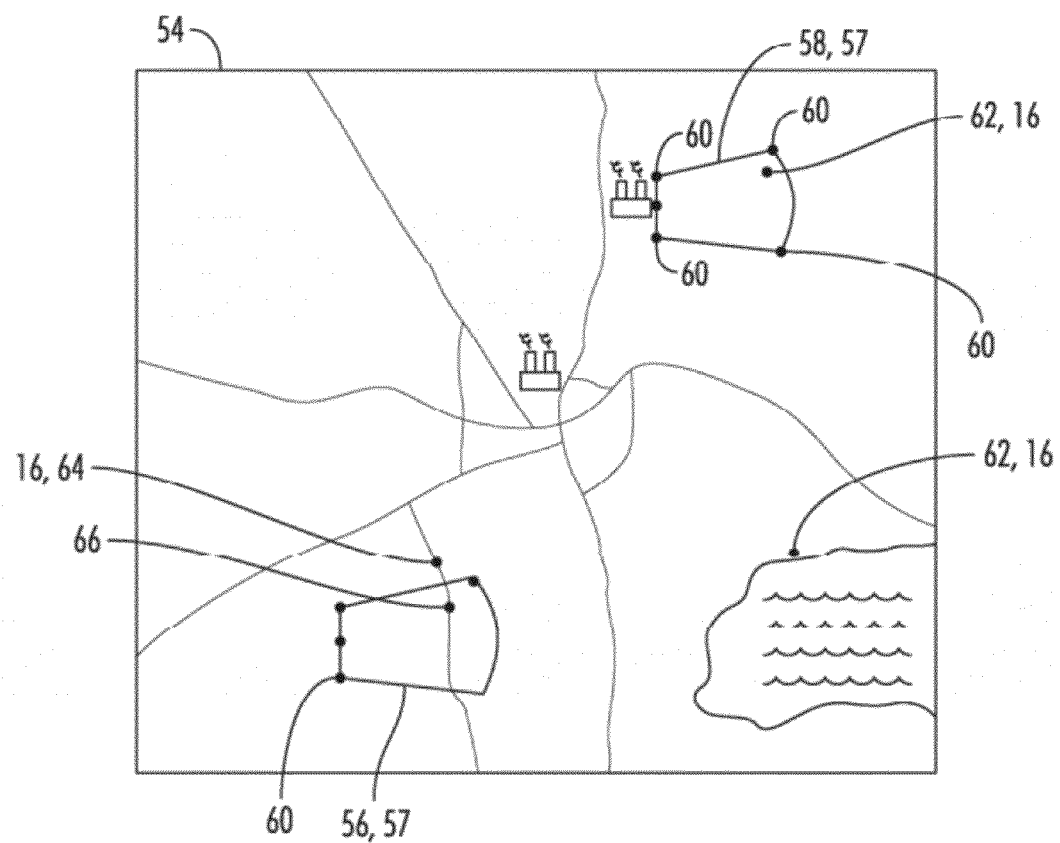
FIG. 5 is a depiction of a map having a storm with a storm affected area, a chemical spill with a hazard affected area, and a collection of points of interest.

The weather alert manager 30 receives meteorological data 48 as necessary and/or available, as best seen in FIG. 1. Meteorological data 48 can include data on weather phenomena that are of interest to users 10. Non-limiting examples of such meteorological data 48 include radar data, lightning strike locations, precipitation observation data, precipitation forecasts, hail, visibility, cloud cover, wind data, wind shear, storm warnings, flood warnings, snow data, etc. Those skilled in the relevant arts will appreciate that such data may be obtained from a variety of sources. Some non-limiting examples of meteorological data 48 sources include the National Oceanic and Atmospheric Administration [NOAA] via its NOAA port, National Weather Service [NWS], National Lightning Detection Network, local Doppler Radars, NEXRAD radars, National Digital Forecast Database, Flash Flood Guidance Grid, local ground-based sensors, and the Rapid Update Cycle [RUC] available from the National Centers for Environmental Prediction [NCEP]. Meteorological data 48 can also be obtained from private third-party weather providers utilizing their own meteorological processing systems, such as the entity identified by the trademark BARON SERVICES. The weather alert manager 30 correlates the meteorological data 48 with the geographic data 54 to produce a storm affected area 56, as seen in FIG. 5.

The weather alert manager 30 can also correlate hazard data 52 with the geographic data 54 to produce a hazard affected area 58. Hazard data 52 can include such things as chemical spills, volcanoes, known civil unrest, traffic incidents, etc. The hazard affected area 58 is comparable to the storm affected area 56. In this description, when a reference is made to meteorological data 48 and/or a storm affected area 56, it is to be understood that in alternative embodiments the data can also include hazard data 52 and an associated hazard affected area 58. Reference generally will be made to just the meteorological data 48 and the storm affected area 56 to avoid excessive repetition herein. The term "environmentally affected area" 57 is defined to include hazard affected areas 58 and/or storm affected areas 56. Also, the term environmental data 51 includes meteorological data 48 and/or hazard data 52.

The storm affected area 56 generally is an area that the current meteorological event is affecting and/or projected to affect over some short period of time (generally less than one hour.) For meteorological events, this is often referred to as a storm track. The storm affected areas 56 are often generated as a pie shape or polygon, often with an increasing width as one moves away from the current location of the event toward the predicted future location of the event.

In an alternate embodiment, the storm affected area 56 can be expanded in certain circumstances. On occasion, a weather radar will detect one or more storms in a predefined geographic area. The storms can be thunderstorms, tornados, or other specified types of weather. When storms are detected in the predefined geographic area, it may be desirable to notify users 10 within that geographic area that weather events are nearby. The predefined geographic area can be defined by political or topographical boundaries, or by a set radius or area, or by historical weather patterns, or any other criteria deemed appropriate. A point of interest 16 may not be within any particular storm track, but there may be one or more storm tracks within the predefined geographic area positioned near the point of interest 16. When a storm is nearby, a user 10 may want to be informed of the potential hazard. To expand the storm affected area 56 and thereby potentially notify users 10, the weather alert manager 30 can evaluate one or more of several factors independently or in conjunction. These factors may include the number of weather events, the distance between weather events, the type of weather event, the severity of the weather event, the topography of the geographic area, and any other factors deemed relevant. If the weather alert manager 30 determines the storm affected area 56 should be expanded, users 10 may be notified regarding points of interest 16 within the predefined geographic area as described in this disclosure.

An example of expanding the storm affected area 56 may clarify this embodiment. Other embodiments are also possible, so the following example is not intended to limit the invention. A predefined geographic area could be two adjacent counties in the northern part of Alabama. The criteria for notifying people in the two county area could include a radar identified rotating storm anywhere within the two counties. If a radar identified rotating storm is detected within the two county area, everyone with a point of interest 16 within the two county area could be notified and directed to a web site with a map showing the position and direction of the rotating storm. Alternatively, everyone with a point of interest 16 within the two county area could be notified of the rotating storm if their user profile 12 indicated they wanted to be notified.

A storm affected area 56 can be defined with corner data points 60. The storm affected area 56 defines the current and predicted future position of a storm. The corner data points 60 provide a geographic reference to define this current and future predicted location of a storm or inclement weather, i.e., correspond to some geo referenced coordinate system. The corner data points 60 can be connected with straight lines or known geometric curves to produce the storm affected area 56. A storm affected area 56 can be defined by three corner data points 60, but essentially any number greater than three corner data points 60 can be used to define the storm affected area 56. Often, four corner data points 60 are used, with the current center of the storm providing a fifth reference point, but other options are within the scope of the current invention, and various shapes and configurations can be used. Also, a curve is often used to connect the two corner data points 60 furthest from the current center of the storm, so the use of straight lines to connect the corner data points 60 is not required. One method for generating a storm affected area from meteorological data 48 and geographic data 54 is more completely described in U.S. Pat. No. 6,125,328, issued Sep. 26, 2000, which is incorporated in its entirety herein.

The weather alert manager 30 may also receive National Weather Service watches, warnings, and/or advisories, and provide notice to a user 10 regarding these National Weather Service watches, warnings, and/or advisories. The watches, warnings, and/or advisories can be issued for a county or other geographical area which can be identified by political boundaries or by natural boundaries. The geographical area described can be defined within the weather alert manager 30 such that the specific locations of the National Weather Service watch, warning, and/or advisory is known and specifically described by the weather alert manager 30. For example, a particular county boundary area can be defined by a number of geo-referenced coordinate points. In this context, if a National Weather Service warning, watch, or advisory is issued for that particular county, the storm affected area 56 corresponds to the county boundaries. Generally, using methods known in the art, the weather alert manager 30 receives meteorological data from one or more sources, and generates one or more storm affected areas 56.

In an alternative embodiment, the storm affected area 56 is not defined by specific geo-referenced coordinate points per se, such as in the traditional pie or polygon shape, but rather by grid cells. Thus a geographic area can be divided into various grid cells, and each grid cell can be associated with meteorological phenomena that may or may not affect that individual grid cell. The grid cells can be formed by overlaying a geographic area with a grid, so the grid cells can be almost any size and/or shape. In some embodiments, the grid cells are square, with a size of 1 kilometer by 1 kilometer, or 10 kilometers by 10 kilometers, etc. Alternatively, the grid cells could be larger or smaller, and they could be triangular, hexagonal, or other shapes. The grid cells themselves have associated geo-referenced coordinates, and the storm affected area 56 in this embodiment is defined by the specific grid cells. Thus, in this embodiment, the storm affected area 56 may be defined by one or more grid cells rather than being defined by specific geo-referenced points. A forecast may predict that a storm will affect a portion of a grid cell, so a storm track boundary cuts across a grid cell. The entire grid cell may then be included in the storm affected area 56, so some positions which are not precisely within a storm track can become included in a storm affected area 56 in this embodiment. One method of associating grid cells with various meteorological data is described in U.S. patent application Ser. No. 11/495,078, filed on Jul. 28, 2006, which is incorporated herein in its entirety.

A storm affected area 56 can include different types of weather, and it may be desirable to associate specific information about a storm with a storm affected area 56. Storm information can be associated with a storm affected area 56 in several different ways. This storm data can include such things as an indication of the type of weather, such as thunderstorm, tornado, snow storm, etc., and it may include other data as well, such as wind speed, temperature, precipitation rate, etc. In one embodiment, one storm affected area 56 may be associated with multiple meteorological phenomena or storm data, i.e., a particular storm affected area 56 is associated with a thunderstorm and a tornado. In another embodiment, a separate storm affected area 56 may be created for each meteorological phenomena (i.e., one for lightning, one for large hail, one for a thunderstorm, one for heavy rain, and one for a tornado). This can result in more than one storm affected area 56 covering the same geographic location. Similar data or different data can be associated with a hazard affected area 58, such as the type of hazard, severity, etc. Other information can also be provided to the weather alert manager 30 as desired. This data can then be used by the weather alert manager 30 to determine if a user profile 12 indicates a user 10 needs to be notified. The geographical area associated with this additional information can be defined such that the weather alert manager 30 has specific boundaries for other relevant information, such as other hazard data 52.

The weather alert manager 30 may only track and report certain types of weather. For example, the system may report tornados, but not clear and sunny days. The weather alert manager 30 may also track and report different types of weather for different categories of users 10, so a premium user 10 can receive information on twenty different types of weather, but an economy user 10 can only receive information on ten different types of weather.

User Alert Message

The weather alert manager 30 accesses several different types of data to determine if a user alert message 68 is needed. For example, the weather alert manager 30 accesses the point of interest locations 62. The point of interest locations 62 for the stationary points of interest 16 are available from the user profile 12 or separate databases. Preferably, the point of interest locations 62 use the same geo-referenced coordinate system as the storm affected area 56 to facilitate analysis. However, it is possible for the point of interest locations 62 to use a different geo-referenced coordinate system than the storm affected area 56.

The weather alert manager 30 may access a mobile point of interest location 64 as well. The mobile point of interest location 64 is a subset of the point of interest locations 62, so all mobile point of interest locations 64 are also point of interest locations 62. Separate reference is made to a mobile point of interest location 64 to provide clarity and added detail to this description. In certain embodiments, the weather alert manager 30 is able to receive the transmitted location of the mobile point of interest 18, store that mobile point of interest location 64 in memory 40, and access the data from memory 40. In alternate embodiments, the weather alert manager 30 can access the mobile point of interest location 64 from other sources, such as a separate computer which maintains the mobile point of interest location 64. In some embodiments, the weather alert manager 30 may only update the mobile point of interest location 64 after a change of at least a set distance, which can help reduce computer time. The stationary point of interest location 62 can be accessed by the weather alert manager 30 in the same manner as the mobile point of interest location 64.

The transmitted mobile point of interest location 64 will be received and at least temporarily stored. In some embodiments, the weather alert manager 30 can access current and historical mobile point of interest locations 64 and use these to predict a projected future mobile point of interest location 66. The projected future mobile point of interest location 66 can be determined by noting movement and time between current and historical mobile point of interest locations 64 and extending a vector from at least one historical mobile point of interest location 64 through the current mobile point of interest location 64. A fan can be added to the projected future mobile point of interest location to account for uncertainty, and variations in direction and speed calculated from historical and current mobile point of interest locations can be used to set the dimensions of the fan. A wide variety of algorithms can be used to make such a prediction, as understood by one skilled in the art.

The weather alert manager 30 compares the point of interest locations 62 to the storm affected area 56 to determine if a point of interest location 62, including mobile point of interest locations 64, is or will be affected. If a point of interest location 62 is positioned within a storm affected area 56, the weather alert manager programming 42 can determine that the point of interest 16 will be impacted by the storm. In the embodiment where the storm affected area 56 is defined by grid cells, discussed above, it is possible that the actual position of the point of interest 16 is not within the precise boundaries of the storm track, yet both the point of interest location 62 and the storm track fall within the same grid cell. In an alternate embodiment, the point of interest location 62 can be determined using coordinates, and the weather alert manager 30 can mathematically determine if the point of interest location 62 falls within the storm affected area 56. The mathematical determination can be done using known geometric principles, so the storm track and the storm affected area 56 are identical. In this embodiment, the storm affected area 56 is defined by known geometric relations, and the coordinate system can specifically define when the mobile point of interest 64 is within the storm affected area 56.

The coordinate system can be one of several embodiments including the latitude and longitude of the various points. Alternatively the coordinate system can include the use of the LORAN coordinate system, or it can use alternate coordinate systems as desired. These alternate coordinate systems can include spherical based coordinates, Cartesian based coordinates, or any other functional system to define locations within a geographic area.

If the weather alert manager 30 determines a point of interest location 62 falls within a storm affected area 56, a user alert message 68 may be needed. In one embodiment, the weather alert manager 30 will then access the user profile 12 to determine if a user alert message 68 is needed. The need for a user alert message 68 can depend on if the user's preferences 24 indicate a message is wanted at the current time, or for the current type of storm, or for any of a wide variety of other factors. If the preferences 24 in the user profile 12 indicate that a user alert message 68 is needed, then the weather alert manager 30 will progress to the next step. If the user profile 12 does not include preferences 24, the weather alert manager 30 may determine that the user alert message 68 is needed, and may progress to the next step.

The weather alert manager 30 may also use the projected future mobile point of interest location 66 to determine if the mobile point of interest 18 will be impacted by the storm at a future time. This can be correlated and analyzed with the user profile 12 and the preferences 24 to determine if a user alert message 68 is needed. One method of determining a future mobile point of interest location 66 is disclosed in U.S. patent application Ser. No. 11/495,078.

If the weather alert manager 30 determines that a user alert message 68 is needed, the weather alert manager 30 prepares the user alert message 68. The user alert message 68 can be customized to the user 10. In some embodiments, for one particular user 10, the weather alert manager 30 will determine all the points of interest 16 which may be impacted by a current storm affected area 56 or by a plurality of current storm affected areas 56. The weather alert manager 30 may then combine the information for each point of interest 16 which may be impacted by a current storm affected area 56 into one message, which can then be transmitted to the user 10. A combined user alert message 68 could read "John, a severe thunderstorm will impact your house in 5 minutes, and a tornado will impact your work in 15 minutes." This method can minimize the number of messages being sent to a user 10. Many people prefer to receive fewer messages, so message consolidation may be desirable.

In one embodiment, the name of the user 10 can be included in the user alert message 68. The user alert message 68 may also include an estimate of the time until the storm impacts the point of interest 16. A user alert message 68 in one embodiment may include references to known local landmarks, such as specific roads, buildings, parks, etc. Local landmarks can be included in the user profile 12 where the user 10 specifies the local landmarks of particular relevance to the user 10. The use of local landmarks in the user alert message 68 may give users 10 a better understanding of the current situation.

The user alert message 68 can take many forms, and it may depend on the preferences 24 provided in the user profile 12. For example, the user alert message 68 may be as simple as a text message saying "severe thunderstorm at your work in 5 minutes." In other embodiments, the user alert message 68 can be an audio alert, or it can be a visual display of a storm, or a combination of the two. In various embodiments, the user alert message 68 can be a text message, a .gif file (for example, showing the current radar image), a .wav file (for example, a radar loop), or any combination of these or other formats. The user alert message 68 can include a link 70 to a website 72 with information relevant to the user 10, such as a display of the storm affected area 56 or a current radar image for a particular geographic area. The website 72 can be a web page, or a subset of another website, or any location available on the World Wide Web which can be accessed with a Uniform Recourse Locator (URL). For example, in one embodiment the user alert message 68 may include "Severe thunderstorm at your work in 5 minutes" along with a link to a website that displays the current radar image overlaid on a map, and the user's point of interest 16 (work) designated on the map. The notice "severe thunderstorm at your work in 5 minutes" can be an audio display, a text message, an e-mail, or some other method used to communicate.

Transmitting a link 70, a text message, or other various forms of the user alert message 68 have different advantages and disadvantages. A simple audio alert takes less bandwidth to transmit than many other types of message, but does not provide as much information as a visual display of the geography and the storm affected area 56. A .gif or a .wav file takes more bandwidth for the message, but also provides more information to the user. Transmission band width can be reduced by minimizing the amount of information included in the user alert message 68. The use of a link 70 or a text message are examples of user alert messages 68 that require less band width than many other types of messages, such as messages with video displays of the storm affected area 56. Certain remote receivers 14 are limited in the type of information that can be displayed to a user 10, so different message formats may be more appropriate for different users 10 and for different remote receivers 14.

In one embodiment, the user alert message 68 includes a link 70 to a website 72 with information relative to a storm. The website 72 can be provided in several different embodiments. In one embodiment, one website 72 is prepared for each storm. In this case, multiple independent users 10 can be directed to the same website 72 to provide the information relevant to them. Each user 10 receives accurate information which is timely and specific to their own points of interest 16. This embodiment allows for a limited number of websites 72 to be produced, which can save on data processing.

There are many different ways to display information on a website 72. In one embodiment, one website 72 can be produced for each user 10. This allows for greater detail to be provided for that specific user 10. For example, a specific website 72 for one user 10 can include displays of pinpointed locations for each point of interest 16 relevant to that user 10. One website 72 per user 10 may also provide more information if more than one storm may impact the points of interest 16 associated with that user 10. In yet another embodiment, the weather alert manager 30 may produce a common website 72 for specific geographic areas. These geographic areas may abut, or they may be overlapping, or they may be of varying sizes, or any combination thereof. The point of interest locations 62 of various different users 10 can be analyzed to determine which website 72 the points of interest 16 fall within. Then the user alert message 68 can direct the user 10 to the website 72 specific to the geographic area within which the relevant points of interest 16 fall. By having varying sizes of the specific geographic areas, the specificity can be relevant for a wide variety of different users 10. This allows the common websites 72 to show more than one storm and provide added detail for the user 10. In yet another embodiment, the weather alert manager 30 can provide one shared website 72 for each storm, with the exception that storms within certain geographic proximity are shown together on the one website 72.

The user alert message 68 can also include text or other information for data that is not necessarily amenable to a graphic display. This may include such things as the National Weather Service's watches, warnings, and/or advisories. These can be text streams which are depicted above or below an image and are streamed as the image is shown. The user alert message 68 can also be as simple as a text message or an audio message or any of the other messages as described in this disclosure.

Once it is determined a user alert message 68 is needed, the weather alert manager 30 prepares the user alert message 68 for transmittal. The user alert message 68 is then transmitted over a distribution network 50 in a manner known to those of skill in the art. The message transmittal can be accomplished in a wide variety of ways, such as wireless, cell phone, internet, pagers, land lines, satellite, and combinations of these and other techniques. The remote receiver 14 then receives the user alert message 68, and may notify the user 10 that a message has been received. In this manner, a system as described can provide site specific, real-time information to a user 10. The provided information is relevant, and can very up-to-date and relevant weather information.

Example Embodiment

Figure 6:
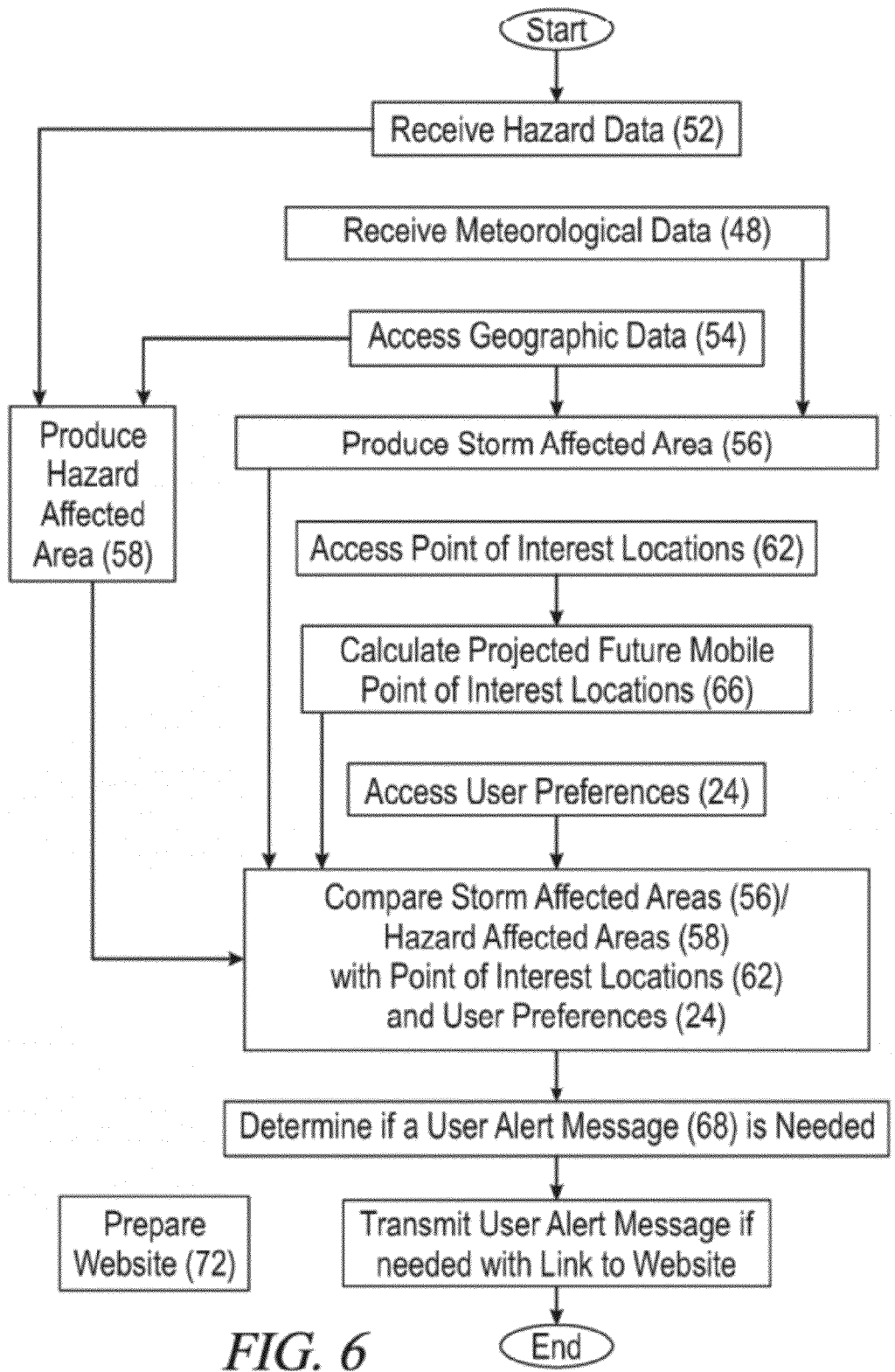
FIG. 6 is a flow chart of one embodiment of the method for providing site specific notices to a user.

One example embodiment of the current invention is shown in FIG. 6, which lists steps performed by the weather alert manager 30. Many of the steps can be done simultaneously, or in a variable order, as will be understood by those of skill in the art. The figure and this description are not intended to limit the order or steps performed.

The weather alert manager 30 receives hazard data 52 and meteorological data 54. The weather alert manager 30 also access geographic data 54, and compares the hazard data 52, meteorological data 54, and geographic data 54 to produce storm affected areas 56 and hazard affected areas 58. Hazard data 52 and meteorological data 54 are current and temporary, as opposed to geographic data 54 which is more consistent, so long term storage of geographic data 54 for later access is reasonable but long term storage of hazard or meteorological data 52, 48 for later access would not provide current information. The point of interest locations 62 are accessed, including accessing and/or calculating a projected future mobile point of interest location 66. User preference 24 data is also accessed.

The weather alert manager 30 compares the storm affected areas 56, hazard affected areas 58, point of interest locations 62 (which may include the projected future mobile point of interest locations 66), and the user preferences 24 to determine if any point of interest locations 62 fall with the storm affected areas 56 or the hazard affected areas 58. If a point of interest location 62 falls within a storm affected area 56 or a hazard affected area 58, the user preferences 24 are referenced to determine if the user 10 desires a user alert message 68 for the relevant type of storm and/or hazard. The weather alert manager 30 also can prepare one or more web sites 72 as needed. If it is determined that a user alert message 68 is needed, the weather alert manager 30 prepares and transmits the user alert message 68, which may include a link 70 to the relevant web site 72. The user alert message 68 can be customized to the user 10, because specific information regarding the user 10 is utilized to determine if a user alert message 68 is needed.

In this manner, a user 10 is informed of current or pending weather or hazards specific to the user 10. This allows the user 10 to take appropriate actions, which can save lives.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A method of providing real-time site specific information comprising:
   (a) providing a weather alert manager having memory comprising a machine readable storage device, the memory including a weather alert manager program to correlate meteorological data with geographic data to produce a storm affected area defined by geo-referenced coordinates;
   (b) establishing a user profile with information about a user who is interested in receiving an alert message, where each user profile comprises:
      (i) a plurality of points of interest, where each point of interest is provided by the user;
      (ii) remote receiver contact information associated with a remote receiver; and
      (iii) user preferences indicating the type of environmental data about which the user desires to be notified;
   where each of said plurality of points of interest have a point of interest location, and where the points of interest include at least one mobile point of interest having a geographic position indicator and a transmitter for transmitting a mobile point of interest location; and where the weather alert manager has access to the user profile;
   (c) transmitting the mobile point of interest location from the mobile point of interest to the weather alert manager;
   (d) accessing the mobile point of interest location by the weather alert manager;
   (e) comparing the storm affected area produced by the weather alert manager with the point of interest locations, including said mobile point of interest location, and the user preferences to determine if the user alert message is needed;
   (f) transmitting the user alert message to the remote receiver using the remote receiver contact information associated with the remote receiver when the user alert message is needed;
   (g) receiving the user alert message in the remote receiver; and
   (h) notifying the user of the user alert message received by the remote receiver.

2. The method of claim 1 where the location of the point of interest is established using a geo-referenced coordinate system, the storm affected area is determined by corner data points using the geo-referenced coordinate system, and the position of the point of interest within the storm affected area is determined by calculations utilizing the storm affected area corner data points and the point of interest location.

3. The method of claim 1 further comprising:
   generating a website which includes a display of the storm affected area; and
   including a link to the website in the user alert message.

4. A method of providing real-time, site specific hazard information to a user comprising:
   (a) providing a weather alert manager comprising a computer having memory with a weather alert manager program to receive and process environmental data to produce an environmentally affected area defined by geo-referenced coordinates, where the memory comprises a machine readable storage device;
   (b) having a user provide a user preference indicating the type of environmental data about which the user desires to be notified;
   (c) accessing a plurality of user profiles, where the user profile contains information about a user who is interested in receiving an alert message, where the user profile comprises:
      (i) a point of interest location, where the point of interest location is associated with a point of interest which has been provided by the user;
      (ii) the user preference; and
      (iii) contact information for a remote receiver;
   and where the point of interest location for at least one user profile comprises a mobile point of interest location associated with a mobile point of interest;
   (d) receiving the mobile point of interest location in the weather alert manager;
   (e) determining the point of interest locations that are located within the environmentally affected area
   (f) comparing the user preferences associated with the point of interest locations within the environmentally affected area to determine if the alert message is heeded; and
   (g) transmitting the needed alert message using the remote receiver contact information.

5. The method of claim 4 further comprising:
   calculating a predicted future mobile point of interest location based on current and historical locations of the mobile point of interest; and
   comparing the environmentally affected area with the predicted future mobile point of interest location and the user profile to determine if the user alert message is needed.

6. The method of claim 4 where at least one user profile comprises more than one point of interest for a single user profile.

7. A method for providing real-time, site specific hazard information comprising:
   (a) providing a weather alert manager comprising a computer having memory with a weather alert manager program to receive and process environmental data to produce an environmentally affected area defined by geo-referenced coordinates, where the memory comprises a machine readable storage device;
   (b) accessing a plurality of user profiles, where the user profile contains information about a user who is interested in receiving an alert message, where the user profile comprises:
      (i) a plurality of point of interest locations, where each point of interest location is associated with a point of interest which has been provided by the user, and where at least one user profile comprises a plurality of point of interest locations for a single user profile,
      (ii) user preferences indicating the type of environmental data about which the user desires to be notified, and
      (iii) contact information for a remote receiver,
   and where the plurality of point of interest locations include at least one mobile point of interest location associated with a mobile point of interest;
   (c) determining the point of interest locations that are located within the environmentally affected area;
   (d) comparing the user preferences associated with the point of interest locations within the environmentally affected area to determine if the alert message is needed; and
   (e) transmitting the needed alert message using the remote receiver contact information.

8. The method of claim 7 further comprising:
   generating a website which includes a display of the environmentally affected area; and
   including a link to the website in the user alert message.

9. The method of claim 7 where the user selects the type of environmental data about which the user wishes to be notified for the user preferences.

10. The method of claim 7 further comprising customizing the user alert message using the user profile.

11. The method of claim 7 where the mobile point of interest transmits its mobile point of interest location at set time intervals.

12. The method of claim 7 where the mobile point of interest is a cellular phone having a geographic position indicator.

13. The method of claim 7 where the environmental data includes meteorological data.

14. The method of claim 13 where the environmental data includes hazard data.

15. The method of claim 7 further comprising:
calculating a predicted future mobile point of interest location based on current and historical locations of the mobile point of interest; and
comparing the environmentally affected area with the predicted future mobile point of interest location and the user profile to determine if the user alert message is needed.

16. The method of claim 7 where at least one point of interest is stationary.

17. The method of claim 7 where the point of interest locations use the same geo-referenced coordinate system as the storm affected area.

18. The method of claim 7 where at least one mobile point of interest is the remote receiver.

19. The method of claim 7 where the alert message comprises a text message and a link to a website containing a visual display of the environmentally affected area.

20. A system for providing real-time site specific information comprising:
(a) a weather alert manager having access to a plurality of user profiles, where the user profile contains information about a user who is interested in receiving an alert message, where at least one user profile comprises a plurality of point of interest locations for that single user profile, where each point of interest location is associated with a point of interest which has been provided by the user, and where the user profile further comprises contact information for a remote receiver, and where the point of interest locations include at least one mobile point of interest location associated with a mobile point of interest, and wherein said weather alert manager memory is programmed to:
(i) receive the mobile point of interest locations from the mobile point of interest;
(ii) receive and process meteorological data to produce a storm affected area;
(iii) determine the point of interest locations that are located within the storm affected area;
(iv) prepare the alert message for the remote receiver associated with the point of interest location within the storm affected area; and
(v) transmit the alert message to the remote receiver using the remote receiver contact information.

21. The system of claim 20 where the weather alert manager is configured to generate a website which includes a display of the storm affected area, and to include a link to the website in the alert message.

22. The system of claim 21 where the alert message further comprises a text message.

23. The system of claim 20 where the storm affected area is defined by geo-referenced coordinates.

24. The system of claim 20 where the storm affected area is defined by grid cells.

25. The system of claim 20 where the user profiles further comprise a user preference, where the user preference indicates the type of environmental data about which the user desires to be notified, where the user selects the type of environmental data about which the user desires to be notified, and the alert message is customized using the user preference.

26. The system of claim 20 where at least one point of interest location is stationary.

* * * * *

UNITED STATES PATENT AND TRADEMARK OFFICE
CERTIFICATE OF CORRECTION

| | | |
|---|---|---|
| PATENT NO. | : 8,264,345 B2 | Page 1 of 1 |
| APPLICATION NO. | : 12/627031 | |
| DATED | : September 11, 2012 | |
| INVENTOR(S) | : Robert O. Baron, Sr. et al. | |

It is certified that error appears in the above-identified patent and that said Letters Patent is hereby corrected as shown below:

Column 13, lines 2-3 currently reading "Uniform Recourse" should read --Uniform Resource--

Column 14, line 18 currently reading "can very" should read --can be very--; line 47 currently reading "fall with the storm" should read --fall within the storm--

Column 16, line 19 currently reading "the alert message is heeded;" should read --the alert message is needed;--

Signed and Sealed this
Eighth Day of January, 2013

David J. Kappos
*Director of the United States Patent and Trademark Office*